United States Patent [19]
Beifuss et al.

[11] Patent Number: 4,589,086
[45] Date of Patent: May 13, 1986

[54] DATA PROCESSING SYSTEM

[75] Inventors: Wolfgang Beifuss; Bernd Haussmann, both of Munich; Michael Pomper, Schliersee; Ewald Soutschek, Putzbrunn Waldkolonie, all of Fed. Rep. of Germany

[73] Assignee: Siemens Aktiengesellschaft, Berlin & Munich, Fed. Rep. of Germany

[21] Appl. No.: 413,213

[22] Filed: Aug. 30, 1982

[30] Foreign Application Priority Data

Aug. 28, 1981 [DE] Fed. Rep. of Germany ....... 3134057

[51] Int. Cl.$^4$ .............................................. G06F 7/52
[52] U.S. Cl. .................................................. 364/760
[58] Field of Search ............... 364/754, 757, 761, 764, 364/765, 759, 766, 760

[56] References Cited

U.S. PATENT DOCUMENTS

| | | | |
|---|---|---|---|
| 3,631,230 | 12/1971 | Chen | 364/764 |
| 4,228,518 | 10/1980 | Chamberlin | 364/759 |
| 4,238,833 | 12/1980 | Ghest | 364/766 |
| 4,484,259 | 11/1984 | Palmer et al. | 364/754 |

OTHER PUBLICATIONS

Mori et al., "A Special-Purpose Computer for Digital Signal Processing" *IEEE Trans. on Computers*, vol. C-24 #12, Dec. 1975, pp. 1202-1211.
Louis Schirm IV "Digital Signal Processing Systems Move to Floating Point Arithmetic Part 2: Implement 32 Bit Mulitplication Computer Design, vol. 19, #9, 9/80, pp. 188-193.
Shlomo Waser "High Speed Monolithic Multipliers for Real-Time Digital Signal Processing" *Computer* Oct. 1978 pp. 19-29.

*Primary Examiner*—James D. Thomas
*Assistant Examiner*—Dale M. Shaw
*Attorney, Agent, or Firm*—Hill, Van Santen, Steadman & Simpson

[57] ABSTRACT

A data processing system having an arithmetic unit is designed for a multiplication of n-place numbers in 2's complement according to the Booth algorithm, and for division of unsigned numerals. A 2n-stage shift register is connected over a logical control circuit to the operation code inputs of an ALU. The control circuit automatically forms instruction code signals to the ALU as a function of informational bits derived from the shift register, whereas other operation code input signals are directly connected to the operation code inputs. The control circuit is a sequential circuit having a multiplexer for the selective through-connection of the multiplication code signals, the division code signals, or other operation code signals to the operation code inputs of the ALU.

9 Claims, 4 Drawing Figures

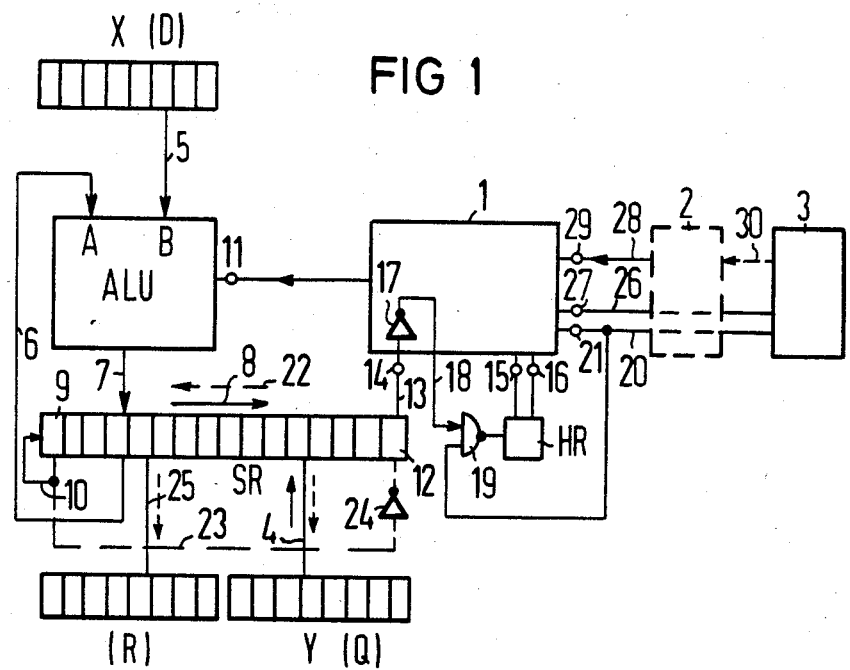
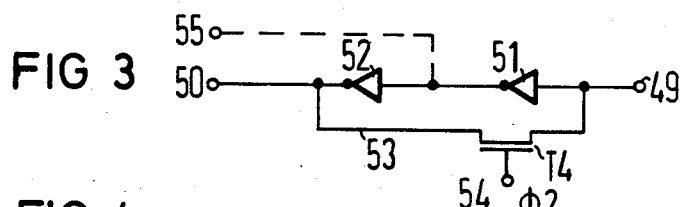
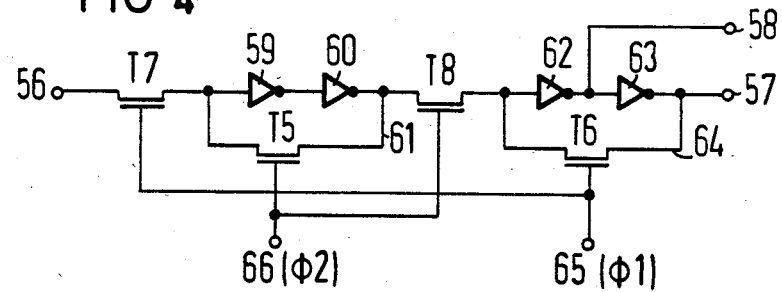

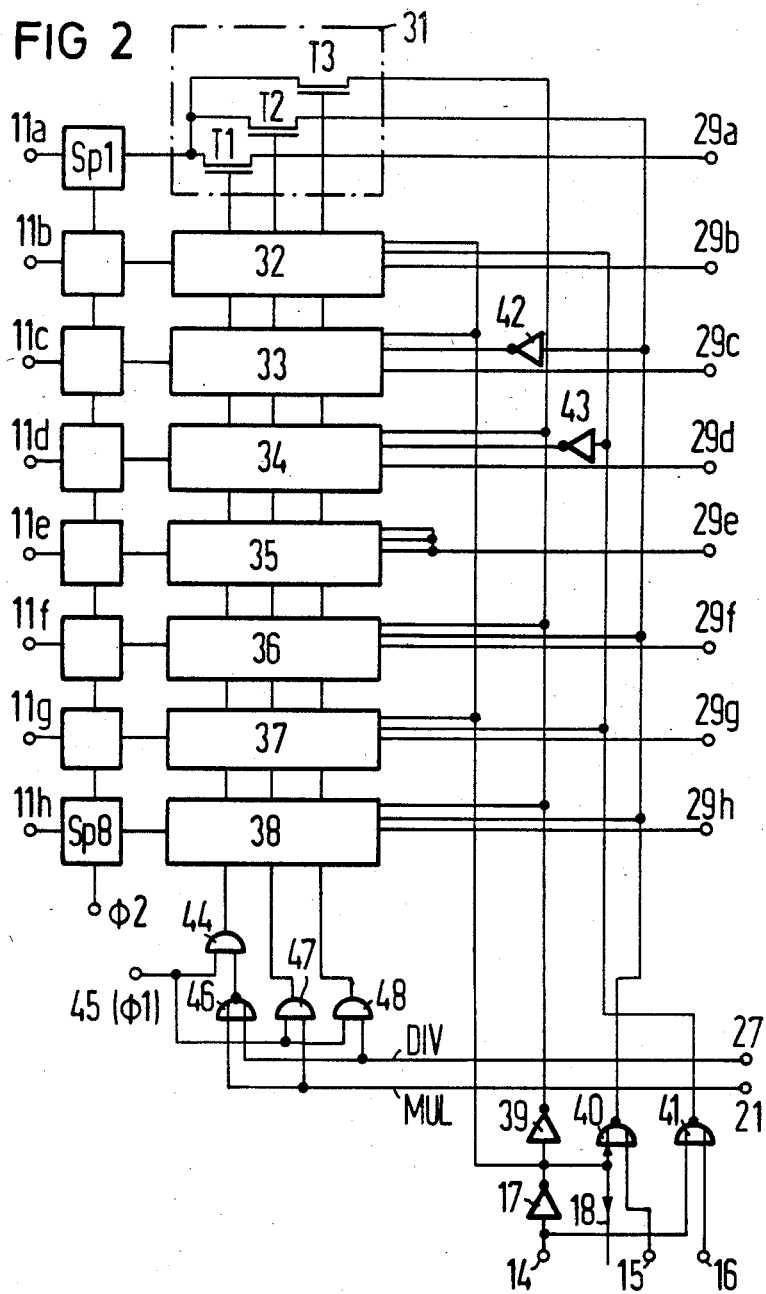

DATA PROCESSING SYSTEM

BACKGROUND OF THE INVENTION

1. Field of the Invention

The present invention relates to a data processing system and particularly to such a system having an arithmetic unit for performing multiplication and division operations.

2. The Prior Art

Arithmetic units for performing multiplication and division operations are described and illustrated, for example, in the book by R. Hoffmann, "Rechenwerke und Mikroprogrammierung" Oldenbourg Verlag, München, Vienna 1977, pages 74–77 and 85–91.

It is desirable, however, to provide a system which incorporates improvements in construction and operation, as compared with the prior art.

BRIEF DESCRIPTION OF THE PRESENT INVENTION

It is a principal object of the present invention to provide an arithmetic unit having a logical control circuit designed in such a manner that a sequence of computing operations is automatically provided in response to the supply of a multiplication (MUL) instruction, or a division (DIV) instruction. The system of the present invention provides a sequence of computer operations allocated to the multiplication and division instructions, and as long as these instructions are not adjacent, the connection of operational code signals to the arithmetic logic unit (ALU) is not adversely affected for other operations.

An advantage achieved by the present invention consists in that there is, for the multiplication/division operation, an automatic sequence of operation code signals corresponding to multiplication and division operations which are delivered to the ALU, and which can be directly inserted in the operational code lines between a control unit and the ALU. At the same time, the sequence for other operations are in no way adversely affected. The complexity and expense of the circuit required in the system of the present invention is substantially reduced, as a result of the autonomous processing of the instructions MUL and DIV.

In accordance with one embodiment of the present invention there is provided a data processing system having an arithmetic unit incorporated in an ALU, two n-place operand registers and a 2n-place shift register for performing a Booth multiplication or division of two operands, a logical control circuit connected with said ALU, said logical control circuit comprising a multiplication/division sequential circuit connected over a first input to a shift register, and over a second input to a single place auxiliary register, said auxiliary register also being connected with said shift register, said logical control circuit incorporating a multiplexer serving for the selective connection of operational code signals including multiplication and division operations to the operation code inputs of said ALU.

These and other objects and advantages of the present invention will become manifest by an inspection of the following description and the accompanying drawings.

BRIEF DESCRIPTION OF THE DRAWINGS

Reference will now be made to the accompanying drawings in which:

FIG. 1 is a block diagram of an illustrative embodiment of the present invention;

FIG. 2 is a functional block diagram of a portion of the apparatus illustrated in FIG. 1;

FIG. 3 is a schematic diagram of a portion of the apparatus illustrated in FIG. 2; and FIG. 4 is a schematic diagram of another portion of the apparatus illustrated in FIG. 1.

DESCRIPTION OF THE PREFERRED EMBODIMENT

Referring now to the drawings, FIG. 1 illustrates the essential components of the arithmetic unit of the data processing system. An arithmetic-logical unit ALU is provided, along with two operand registers X(D) and Y(Q). Also provided are shift register SR, a further register R, an auxiliary register HR, a logical control circuit 1, and a sequence control unit 2. The sequence control unit 2 can be omitted if desired, and for that reason is shown in dashed lines in FIG. 1. A control unit 3 of the data processing system originates control signals which are connected to the logical control unit 1, either directly or through the sequence control unit 2. The logical control unit 1 supplies a number of outputs to the control inputs 11 of the ALU, and the A and B inputs of the ALU are connected respectively from the left half of the shift register SR over a line 6, and from the X(D) register over a line 5.

During an operation, the X(D) register is loaded with an n-place operand, and the register Y(Q) is loaded with a second n-place operand. Both operands preferably consist of integer numbers provided with operational signs, having n bits represented in two's complement form. For the execution of a multiplication operation, according to the Booth algorithm, the second operand is transferred from the register Y(Q) over lines 4 into the right half of the 2 n-place shift register SR, the left half of which is first occupied at all locations with zeros. The operand in the X(D) register is supplied over lines 5 to the B input of the ALU, and the content of the left half of the shift register SR is supplied over lines 6 to the A input of the ALU. In a first multiplication sub-step, the signals supplied to the A and B inputs of the ALU are logically linked to each other, and the result is transferred into the left half of the shift register SR over lines 7. At the same time, a shift of all bits in the shift register SR, by one place toward the right, occurs, as indicated by the arrow 8. The bit situated at the first location 9 of the shift register SR is thereby both shifted toward the right as well as read into the left end 9 of the shift register SR over the line 10.

The manner in which the operands are linked for the first sub-step is determined by the bit pattern supplied to the operational code input 11 from the logical control circuit 1. The linkage depends on the identity of the bit of the last location 12 of the shift register SR, which is supplied to the input 14 of the logical control unit 1 over a line 13. The operation of the logical control unit 1 is also determined by the content of the auxiliary register HR, complementary outputs of which are supplied over lines 15 and 16 to inputs of the logical control unit 1. Whereas a "0" is initially present in the register HR during the first multiplication sub-step, the "0" is replaced after the first shift by the bit formerly located at position 12 of the shift register SR. This bit is supplied through an inverter 17 and over a line 18 through a NAND gate 19, which is conditioned by a logical "1" applied to the input 21 during the multiplication instruction, over the line 20.

The second sub-step again links logically the inputs supplied to the A and B inputs of the ALU, and the result is again supplied to the shift register SR and shifted one step toward the right. After n sub-steps, with sequence in the manner described above, and which are controlled by a logical linkage rules determined by the bits in the position 12 of the shift register SR and in the auxiliary register HR, a 2n-place multiplication result is resident in the shift register SR. During the entire sequence of the sub-steps, the line 20 is high, to designate a multiplication instruction MUL.

When a division of two unsighed integer numbers is to be executed, a division instruction DIV provides a logical "1" the line 26, with a logical "0" being applied to the line 20. A first operand, viz., the dividend, is placed in the shift register SR, and a second operand, the divisor, is loaded into the upper operand register X(D). In the first sub-step of the division algorithm, the number stored in the left half of the shift register SR is supplied to the input A of the ALU, and the divisor is supplied from the X(D) register over the lines 5 to the B input of the ALU. Because of the logical "0" on the line 20, the gate 19 remains blocked, so that only the control circuit 1 determines, as a function of of the bit resident in position 12 of the shift register SR, the logical linkage rules allocated to the sub-steps. Result of the logical linkage is transferred into the left half of the shift register SR, after which a shift of all bits in the SR by one place toward the left takes place simultaneously, this indicated by the dashed arrow 22. The bit transferred from the ALU into the position 9 is shifted over a line 23 and supplied in inverted form to the position 12 of the shift register SR, thereby to determine the logical linkage rule for the next sub-step. At the end of n such sub-steps, the quotient resides in the right half of the shift register SR, and is read out over the lines 4 into the lower n-place Y(Q) register, while the division remainder is transferred from the left half of the shift register SR over lines 25 into an n-place register R. This transfer is signified by the dashed arrows adjacent lines 4 and 25. During the entire division operation, the line 26 is high or at logical"1" to designate the division instruction.

The algorithms used for multiplication and division as described above are referred to in more detail in the Hoffmann book cited above.

FIG. 2 illustrates a functional block diagram, partly in schematic circuit diagram form, of the logical control unit 1. As illustrated in FIG. 2, the lines 28 which are connected to the inputs 29 of the logical control unit 1, comprise eight input terminals 29a-29h. The operational code signals supplied to these inputs, in the form of a eight-bit words, designate different arithmetic and logical operations, such as addition, subtraction, increment formation, decrement formation, etc.

When the optional sequence control unit 2 is employed, the signal supplied to the plural lines 28 are derived from basic instructions as ADD, SUB, INC, DEC, etc., which are supplied to the sequence control unit from the control unit 3 over a line 30. When the sequence control unit 2 is not employed, then the operation code signals to the inputs 29 are supplied directly from the control unit 3. In any event, the commands MUL and DIV from the control unit 3 are supplied to the inputs 21 and 27 respectively without modification by the sequence control unit 2.

As shown in FIG. 2, the eight inputs 29a-29h are connected by multiplex units 31-38, respectively, to eight inputs 11a-11h of the ALU. The inputs 14-16, 21 and 27, and the output 18 corresponds to the similarly designated lines in FIG. 1.

Each of the multiplexers 31-38 contains identical circuits, and the multiplexer 31 is illustrated in detail in FIG. 2. It comprises three field effect switching transistors T1, T2, and T3, each having its output connected to the input of an intermediate memory SP1, interposed between the multiplexer 31 and the output 11a.

Each of the upper switching transistors, corresponding to T3 in the multiplexer 31, (with the exception of multiplexer 35) is connected to either the output of inverter 17, or the output of inverter 39, the latter having its input connected to the output of the inverter 17. Each of the switching transistors corresponding to the transistor T2 of the multiplexer 31 (except for the multiplexer 35) is connected to an output of one of the NOR gates 40 and 41, either directly or through inverters 42 or 43. The switching segments of the lower transistors T1 of each of the multiplexers 31-38 is connected to an individual one of the inputs 29a-29h. The middle and upper switching transistors of the multiplexer 35 are similarly connected, and may optionally be omitted all together.

The gates of all of the lower switching transistors corresponding to the transistor T1 of the multiplexer 31 are connected in common to the output of an AND gate 44; the gates of all of the central switching transistors are connected in common to the output of the AND gate 47; and the gates of the upper transistors corresponding to T3 of the multiplexer 31 are all connected in common to the output of an AND gate 48. Similarly, the control inputs of all of the intermediate memories SP1-SP8 are connected in common to a clock signal indicated in FIG. 2 as phi 2.

One input of the AND gate 44 is connected to a terminal 45 to which is supplied a source of clock pulses phi 1 and the other input of the AND gate 44 is connected to the output of a NOR gate 46. The inputs of the NOR gate 46 are connected to the terminals 21 and 27. One input of each of the AND gates 47 and 48 are also connected to the terminal 45, with the second input of the gate 47 being connected to the terminal 21, and the second input of the gate 48 being connected to the terminal 27.

During operation, the upper transistors are all switched conductive, at an appropriate clock phase, when a high signal is supplied to the terminal 27 during a DIV operation and supply signals to their respective outputs in accordance with the outputs of the inverters 17 and 39, in response to the signal appearing at terminal 14, which, as shown in FIG. 1, derives from position 12 of the shift register SR. An eight bit code is therefore supplied to the eight lines of terminal 11, which represent a division code for the ALU.

The center transistors, corresponding to T2 of multiplexer 31, are all operative to supply an operational code to the ALU when the MUL line is high as a result of a signal at terminal 21. Then the operational code is applied to the ALU is controlled by the outputs of NOR gates 40 and 41, each of which has one input connected to the terminals 15 and 16 respectively, and the other connected respectively to the terminal 14 or the output of the inverter 17. The eight bit code supplied to the terminals 11 represent a multiplication code for the ALU.

The lower switching transistors, corresponding to the unit T1 of the multiplexer 31, are made conductive in response to a logical 1 output of the NOR gate 46, which occurs when both terminals 21 and 27 are low, or at a logical zero. At this time, the inputs 29a–29h are connected directly to the output 11a–11h so that the operation code is specified by the control unit 3.

The following table indicates the outputs on the lines 11a–11h, as the result of various inputs applied to the terminals 27, 21, 14 and 15, and to the inputs 29a–29h. The outputs for eight different conditions, indicated as Z1 through Z7, are indicated.

|    | 27 | 21 | 14 | 15 | 11d | 11c | 11b | 11a | 11g | 11f | 11e | 11h |
|----|----|----|----|----|-----|-----|-----|-----|-----|-----|-----|-----|
| Z1 | 0  | 0  | —  | —  | 29d | 29c | 29b | 29a | 29g | 29f | 29e | 29h |
| Z2 | 0  | 1  | 0  | 0  | 1   | 1   | 0   | 0   | 0   | 0   | 0   | 0   |
| Z3 | 0  | 1  | 0  | 1  | 0   | 1   | 1   | 0   | 1   | 0   | 0   | 0   |
| Z4 | 0  | 1  | 1  | 0  | 1   | 0   | 0   | 1   | 0   | 1   | 0   | 1   |
| Z5 | 0  | 1  | 1  | 1  | 1   | 1   | 0   | 0   | 0   | 0   | 0   | 0   |
| Z6 | 1  | 0  | 0  | —  | 0   | 1   | 1   | 0   | 1   | 0   | 0   | 0   |
| Z7 | 1  | 0  | 1  | —  | 1   | 0   | 0   | 1   | 0   | 1   | 0   | 1   |

In the table, the line Z1 corresponds to logical zero inputs at the terminals 27 and 21, in which case the inputs at the terminals 14 and 15 are irrelevant. Each of the signals applied to the individual inputs 29a–29h is connected directly to the corresponding outputs 11a–11h. The lines Z2 through Z4 of the table describe the multiplication code, for various combinations of bits on terminals 14 and 15, and the lines Z6 and Z7 represent the division code.

The linkage rule of the line Z2 provides for a through connection of the operand at the A input to the left part of the shift register SR, without linkage with the B operand. The line Z3 corresponds to addition of the operand at A and B, with the sum placed in the shift register SR. Line Z4 denotes a subtraction of the B operand from the A operand, and the line Z5 describes a through connection corresponding to the line Z2. The line Z6 describes the logical linkage of addition the A operand and B operand, the line Z7 describes an operation which subtracts the B operand from the A operand.

FIG. 3 illustrates a schematic diagram of one of the identical intermediate memory units SP1–SP8. It has an input 49 connected to the input of a first inverter 51, the output of which is connected through a second inverter 52 to an output 50. An optional output of the inverter 51 is provided at terminal 55. A branch 53 connects the output terminal 50 to the input terminal 49 through a switching transistor T4, the gate of which is connected at terminal 54 to the clock signal phi 2. The circuit comprises a flip-flop, which is set to one of its stable states by a signal in the line 49, and maintained in that stage as long as the gate signal is applied to the terminal 54.

FIG. 4 illustrates a schematic diagram of the auxiliary register HR, as executed in MOS technology. It incorporates a master-slave flip-flop having an input 56, and complementary outputs 57 and 58. The input 56 is connected to the output of the NAND gate 19 of FIG. 1, and the outputs 57 and 58 are connected respectively to the input terminals 15 and 16 (FIGS. 1 and 2). The master flip-flop consists of two inverters 59 and 60, connected in series and bridged by a back coupling branch 61 having a switching transistor T5. The slave flip-flop contains series connected inverter 62 and 63, which are bridged by a back coupling branch 64 containing a switching transistor T6. The input of the inverter 59 is connected to the input terminal 56 by a further switching transistor T7, and the output of the inverter 60 is connected to the input of the inverter 62 by another switching transistor T8. The gate electrodes of the switching transistors T6 and T7 are connected in common to the terminal 65 which is supplied with clock pulses phi 1, and the gate electrodes of the switching transistors T5 and T8 are connected in common to a terminal 66 which is supplied with clock pulses phi 2.

When the clock pulse phi 1 is high, the respective switching transistors of the multiplexers 31–38 are switched conductive, so that the inputs of the intermediate memories SP1–SP8 are provided with a signal. At the time of the next successive clock pulse phi 2, which appears alternately with the clock pulses phi 1, these signals are intermediately stored and retransmitted to the outputs 11a–11h. During the occurrence of clock pulses phi 1, the inputs 15 and 16 are also provided with signals from the terminals 57 and 58 and during the preceding clock pulse phi 2, such signals are forwarded from the master flip-flop 59, 60, to the slave flip-flops 62, 63.

In one embodiment of the present invention, the ALU unit may constitute an ALU unit marketed by the Texas Instruments Company and designated SN 74181 or SN 74 381.

It will be apparent that various modifications and additions may be made in the apparatus of the present invention without departing from the essential features of novelty thereof, which are intended to be defined and secured by the appending claims.

We claim as our invention:

1. In a data processing system having an arithmetic/logical unit, two operand registers with capacity n and a shift register with capacity 2 n designed for a Booth multiplication or division of two operands, the combination comprising;
   a logical control circuit for supplying operation code inputs to said arithmetic/logical unit, said logical control circuit being connected over a first input to an output of said shift register,
   a single-place auxiliary register means connecting an input of said logical control circuit to the least significant output of said shift register, said logical control circuit having a multiplexer connected to and responsive to said auxiliary register for the selective connection of operation code signals directly from its inputs and over its outputs to the operation code inputs of said arithmetic/logical unit.

2. Apparatus according to claim 1, including a multiplication/division sequence circuit and wherein said multiplexer comprises three groups of switching transistors; means connecting the switching terminals of the switching transistors of said first group to the first input of said multiplication/division sequence circuit, gate means for connecting the switching terminals of the switching transistors of said second group to said first and to a second input of said multiplication/division sequence circuit, and means connecting the switching terminals of the switching transistors of said third group to further inputs of said multiplication/division sequence circuit.

3. Apparatus according to claim 2, including a gate circuit having two inputs connected to a multiplication signal and to a division signal, and three outputs for the separate selection of the three groups of switching transistors.

4. Apparatus according to one of the claims 1 through 3, wherein said auxiliary register is connected to said shift register through a gate enabled during a multiplication signal.

5. Apparatus according to one of the claims 1 through 3, including a plurality of intermediate memories connected to outputs of the multiplexer.

6. Apparatus according to one of the claims 1 through 3, wherein said auxiliary register comprises a master-slave flip-flop.

7. Apparatus according to claim 2, including means for connecting clock pulses to said switching transistors.

8. Apparatus according to claim 5 including means for connecting clock pulses to said intermediate memories.

9. Apparatus according to claim 6, including means for connecting clock pulses to said master-slave flip-flop.

* * * * *